United States Patent
Liu et al.

(10) Patent No.: US 9,973,224 B2
(45) Date of Patent: May 15, 2018

(54) INTERFERENCE CANCELLATION APPARATUS AND METHOD

(71) Applicant: Huawei Technologies Co., Ltd., Shenzhen (CN)

(72) Inventors: Sheng Liu, Shenzhen (CN); Teyan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/388,968

(22) Filed: Dec. 22, 2016

(65) Prior Publication Data
US 2017/0104506 A1    Apr. 13, 2017

Related U.S. Application Data

(63) Continuation of application No. PCT/CN2014/080870, filed on Jun. 26, 2014.

(51) Int. Cl.
*H04B 1/10* (2006.01)
*H04L 27/26* (2006.01)
(Continued)

(52) U.S. Cl.
CPC .......... *H04B 1/1027* (2013.01); *H04L 27/26* (2013.01); *H04B 1/10* (2013.01); *H04B 1/525* (2013.01);
(Continued)

(58) Field of Classification Search
CPC .......... H04B 1/10; H04B 1/109; H04B 1/525; H04B 7/15585
(Continued)

(56) References Cited

U.S. PATENT DOCUMENTS 5,691,978 A   11/1997 Kenworthy
6,229,992 B1   5/2001 McGeehan et al.
(Continued)

FOREIGN PATENT DOCUMENTS

CN   101453228 A   6/2009
CN   101656562 A   2/2010
(Continued)

OTHER PUBLICATIONS

Youxi, "Co-frequency Co-time Full Duplex Test Bed," Powerpoint, National Communication Lab (May 28, 2013).
(Continued)

*Primary Examiner* — Duc M Nguyen
(74) *Attorney, Agent, or Firm* — Leydig, Voit & Mayer, Ltd.

(57) ABSTRACT

Embodiments of the present invention provide an interference cancellation apparatus and method. The method includes: receiving a radio frequency receive signal by using a main receive antenna; canceling a first-type self-interference component in the radio frequency receive signal according to a radio frequency reference signal, to generate a first processed signal; acquiring the reconstructed self-interference signal according to a self-interference channel parameter and the radio frequency reference signal; canceling a second-type self-interference component in the first processed signal according to the reconstructed self-interference signal to generate a second processed signal; performing down-conversion processing on the second processed signal to generate a third processed signal; performing analog to digital conversion on the third processed signal to generate a digital signal; and acquiring a digital baseband reference signal, and performing self-interference channel estimation according to the digital baseband
(Continued)

reference signal and the digital signal to acquire the self-interference channel parameter.

20 Claims, 12 Drawing Sheets

(51) Int. Cl.
 H04W 84/12 (2009.01)
 H04W 84/04 (2009.01)
 H04B 1/525 (2015.01)
 H04B 7/155 (2006.01)
(52) U.S. Cl.
 CPC ....... *H04B 7/15585* (2013.01); *H04W 84/042* (2013.01); *H04W 84/12* (2013.01)
(58) Field of Classification Search
 USPC ................. 455/295, 296, 304, 305, 310–312
 See application file for complete search history.

(56) References Cited

U.S. PATENT DOCUMENTS

| | | | | |
|---|---|---|---|---|
| 7,729,431 | B2* | 6/2010 | Gebara | H01Q 1/521 375/259 |
| 7,804,760 | B2* | 9/2010 | Schmukler | H03H 11/265 370/201 |
| 8,249,540 | B1* | 8/2012 | Gupta | H04B 1/109 455/295 |
| 8,977,223 | B1* | 3/2015 | Gupta | H04B 1/109 455/295 |
| 9,019,849 | B2* | 4/2015 | Hui | H01Q 3/2611 370/252 |
| 9,100,110 | B2* | 8/2015 | Wang | H04B 15/00 |
| 9,124,332 | B2 | 9/2015 | Wang et al. | |
| 9,312,895 | B1* | 4/2016 | Gupta | H04B 1/109 |
| 2003/0098806 | A1* | 5/2003 | Green | H03D 7/16 341/144 |
| 2008/0008126 | A1 | 1/2008 | Shirakabe et al. | |
| 2008/0107046 | A1 | 5/2008 | Kangasmaa et al. | |
| 2011/0285508 | A1 | 11/2011 | Kim | |
| 2012/0002586 | A1 | 1/2012 | Gainey et al. | |
| 2013/0301487 | A1 | 11/2013 | Khandani | |
| 2014/0016515 | A1 | 1/2014 | Jana et al. | |
| 2014/0348018 | A1* | 11/2014 | Bharadia | H04L 5/1461 370/252 |
| 2015/0156001 | A1 | 6/2015 | Lin et al. | |
| 2015/0180640 | A1 | 6/2015 | Liu | |
| 2015/0212194 | A1 | 7/2015 | Obiya et al. | |
| 2016/0226653 | A1* | 8/2016 | Bharadia | H04B 1/525 |
| 2016/0285502 | A1* | 9/2016 | Liu | H04B 1/525 |
| 2017/0005773 | A1* | 1/2017 | Liu | H04B 1/525 |
| 2017/0085398 | A1 | 3/2017 | Liu | |
| 2017/0104506 | A1 | 4/2017 | Liu et al. | |
| 2017/0111155 | A1 | 4/2017 | Liu et al. | |

FOREIGN PATENT DOCUMENTS

| | | |
|---|---|---|
| CN | 103139115 A | 6/2013 |
| CN | 103200140 A | 7/2013 |
| CN | 103297069 A | 9/2013 |
| CN | 103580720 A | 2/2014 |
| CN | 103685098 A | 3/2014 |
| CN | 103701480 A | 4/2014 |
| EP | 3068055 A1 | 9/2016 |
| JP | 2013532447 A | 8/2013 |
| KR | 20130061326 A | 6/2013 |
| RU | 2005141504 A | 8/2006 |
| WO | 2004107596 A1 | 12/2004 |
| WO | 2009114638 A1 | 9/2009 |
| WO | 2014036930 A1 | 3/2014 |
| WO | WO 2014061443 A1 | 4/2014 |
| WO | 2014108098 A1 | 7/2014 |
| WO | 2015048678 A1 | 4/2015 |

OTHER PUBLICATIONS

Duarte et al., "Design and Characterization of a Full-Duplex Multiantenna System for WiFi Networks," IEEE Transactions on Vehicular Technology, vol. 63, No. 3, pp. 1160-1177, Institute of Electrical and Electronic Engineers (Mar. 2014).
Bharadia et al., "Full Duplex MIMO Radios," Stanford University (2014).
Bharadia et al., "Full Duplex Radios," Stanford University (2013).
MAXIM; Single-/Dual-Band 802.11a/b/g World-Band Transceiver ICs, pp. 1-39 (2004).
Jain et al., "Practical, Real-time, Full Duplex Wireless," Stanford University (2011).

* cited by examiner

INTERFERENCE CANCELLATION APPARATUS AND METHOD

CROSS-REFERENCE TO RELATED APPLICATIONS

This application is a continuation of International Patent Application No. PCT/CN2014/080870, filed on Jun. 26, 2014, the disclosure of which is hereby incorporated by reference in its entirety.

TECHNICAL FIELD

Embodiments of the present invention relate to the field of communications technologies, and in particular, to an interference cancellation apparatus and method.

BACKGROUND

In a wireless communications system such as a mobile cellular communications system, a wireless local area network (WLAN, Wireless Local Area Network), or a fixed wireless access (FWA, Fixed Wireless Access) system, communications nodes such as a base station (BS, Base Station) or an access point (AP, Access Point), a relay station (RS, Relay Station), and user equipment (UE, User Equipment) are generally capable of transmitting their own signals and receiving signals from other communications nodes. Because a radio signal is attenuated greatly in a radio channel, in comparison with a transmit signal of a local end, a signal coming from a communications peer becomes very weak when the signal arrives at a receive end. For example, a difference between transmit power and receive power of a communications node in the mobile cellular communications system may be up to 80 dB to 140 dB or even greater. Therefore, to avoid self-interference caused by a transmit signal of a transceiver to a receive signal of the transceiver, radio signal transmission and reception are generally differentiated by using different frequency bands or different time periods. For example, in a Frequency Division Duplex (FDD, Frequency Division Duplex) system, for transmission and reception, communication is performed by using different frequency bands separated by a certain guard band; in a Time Division Duplex (TDD, Time Division Duplex) system, for transmission and reception, communication is performed by using different time periods separated by a certain guard time interval, where the guard band in the TDD system and the guard time interval in the FDD system are both used to ensure that reception and transmission are fully isolated and to avoid interference caused by transmission to reception.

Different from the conventional FDD or TDD technology, a wireless full duplex technology may implement operations of reception and transmission simultaneously on a same radio channel. In this way, spectral efficiency of the wireless full duplex technology is twice that of the FDD or TDD technology. Apparently, a precondition for implementing wireless full duplex lies in that strong interference (referred to as self-interference, Self-interference) caused by a transmit signal of a transceiver to a receive signal of the transceiver is avoided, reduced, or canceled as much as possible, so that no adverse impact is caused to proper reception of a wanted signal.

In a full duplex system, self-interference entering a receiver mainly includes two types of self-interference components.

A first-type self-interference component is a main-path self-interference component, and its power is relatively high. The main-path self-interference component mainly includes a self-interference signal that is leaked from a transmit end to a receive end due to leakage of a circulator, and a self-interference signal that enters the receive end due to antenna echo reflection. Conventional passive radio frequency self-interference cancellation is mainly used to cancel the first-type self-interference component. A path delay, power, and phase of this type of component depend on hardware itself such as an intermediate radio frequency unit and an antenna and a feeder of a specific transceiver. The path delay, power, and phase are basically fixed or change slowly, and it is unnecessary to perform fast tracing on each interference path of the first-type self-interference component.

A second-type self-interference component is mainly a self-interference component that is formed after a transmit signal is transmitted by a transmit antenna and encounters multi-path reflection at a scatterer or a reflection plane or the like in a spatial propagation process. When the full duplex technology is applied to scenarios such as a base station and a relay station in a cellular system, and a WiFi access point (AP) disposed outdoors, because antennas of the devices are generally mounted relatively high, and there are few scatterers or reflection planes within a range of several meters to tens of meters around the devices, multi-path delays of multi-path reflected self-interference components that undergo spatial propagation, in the signals received by the devices, are relatively great and widely distributed, and with an increase in delays, power of corresponding multi-path signals (signals reflected from scatterers or reflection planes or the like that are far away) tends to decrease.

In the prior art, generally, an apparatus having a structure shown in FIG. 1 is used to cancel the second-type self-interference component in a manner of active analog self-interference cancellation or digital baseband self-interference cancellation. Specifically, a baseband digital self-interference signal reconstructed in a digital domain is reconverted to an analog domain by using a digital to analog converter (Digital to Analog Converter, DAC), and then undergoes analog baseband processing (not shown in the figure) in the analog domain or is up-converted to an intermediate radio frequency, and is used to cancel a self-interference signal included in an analog receive signal; digital baseband self-interference cancellation in the digital domain is to use a reconstructed baseband digital self-interference signal to directly cancel a self-interference signal included in a digital receive signal in the digital domain. However, self-interference cancellation performance of the apparatus is finally limited by a dynamic range of an ADC (Analog-to-Digital Converter, analog to digital converter)/DAC (Digital-to-Analog Converter, digital to analog converter). Generally, the dynamic range of the ADC/DAC is about 60 dB. Therefore, when power of the second-type self-interference component is 60 dB higher than that of a wanted signal, the second-type self-interference component cannot be effectively canceled in the conventional method.

SUMMARY

Embodiments of the present invention provide an interference cancellation apparatus and method, which can avoid being limited by a dynamic range of an ADC/DAC and can cancel a second-type self-interference component effectively.

According to a first aspect, an interference cancellation apparatus is provided, including:

a main receive antenna (110), configured to receive a radio frequency receive signal, and transmit the radio frequency receive signal to a first-type interference canceller (130);

a splitter (120), configured to acquire a radio frequency reference signal generated according to a transmit signal, and transmit the radio frequency reference signal to the first-type interference canceller (130) and a second-type interference reconstructor (150);

the first-type interference canceller (130), configured to receive the radio frequency reference signal transmitted by the splitter (120) and the radio frequency receive signal transmitted by the main receive antenna (110), and cancel a first-type self-interference component in the radio frequency receive signal according to the radio frequency reference signal to acquire a first processed signal, where the first-type self-interference component includes a main-path self-interference component;

the second-type interference reconstructor (150), configured to acquire the reconstructed self-interference signal according to a self-interference channel parameter and the radio frequency reference signal transmitted by the splitter (120);

a coupler (140), configured to receive the first processed signal and the reconstructed self-interference signal transmitted by the second-type interference reconstructor (150), and cancel a second-type self-interference component in the first processed signal according to the reconstructed self-interference signal to generate a second processed signal;

a down converter (160), configured to perform down-conversion processing on the second processed signal to generate a third processed signal; and an analog to digital converter ADC (170), configured to perform analog to digital conversion on the third processed signal to generate a digital signal; where the second-type interference reconstructor (150) is further configured to acquire a digital baseband reference signal, receive the digital signal generated by the analog to digital converter ADC (170) and the radio frequency reference signal transmitted by the splitter (120), and perform self-interference channel estimation according to the digital baseband reference signal and the digital signal to acquire the self-interference channel parameter.

With reference to the first aspect, in a first possible implementation manner, the second-type interference reconstructor (150) includes:

a self-interference estimation module (1501), configured to acquire the digital baseband reference signal, receive the digital signal generated by the analog to digital converter ADC (170), and perform self-interference channel estimation according to the digital baseband reference signal and the digital signal to acquire the self-interference channel parameter; and a self-interference signal reconstruction module (1502), configured to receive the radio frequency reference signal transmitted by the splitter (120) and the self-interference channel parameter acquired by the self-interference estimation module (1501), and acquire the reconstructed self-interference signal according to the self-interference channel parameter and the radio frequency reference signal.

With reference to the first aspect, in a second possible implementation manner, the apparatus further includes a first amplifier, where the first amplifier is configured to amplify the second processed signal.

With reference to the first aspect, in a third possible implementation manner, the apparatus further includes a second amplifier and a third amplifier, where:

the second amplifier is configured to amplify the first processed signal; and the third amplifier is configured to amplify the radio frequency reference signal received by the second-type interference reconstructor.

With reference to the first possible implementation manner of the first aspect, in a fourth possible implementation manner, the self-interference signal reconstruction module (1502) includes:

a first delayer group, a first amplitude and phase adjuster group, and a first combiner, where:

the first delayer group includes at least one delayer, where the at least one delayer is connected in series, and the first delayer group is configured to receive the radio frequency reference signal, and perform delay processing on the radio frequency reference signal by using the at least one delayer sequentially, to form a delay signal of at least one radio frequency reference signal;

the first amplitude and phase adjuster group includes at least one amplitude and phase adjuster, where each amplitude and phase adjuster is configured to perform amplitude and phase adjustment on a delay signal of one radio frequency reference signal according to the self-interference channel parameter; and the first combiner is configured to perform combination processing on delay signals that are of radio frequency reference signals and obtained after amplitude and phase adjustment, to generate the reconstructed self-interference signal.

With reference to the fourth possible implementation manner of the first aspect, in a fifth possible implementation manner, the self-interference signal reconstruction module (1502) further includes:

a first radio frequency selection switch, configured to receive the delay signal of the at least one radio frequency reference signal, select, from delay signals of all radio frequency reference signals, a delay signal of at least one radio frequency reference signal according to the self-interference channel parameter, and transmit the selected delay signal of the at least one radio frequency reference signal to the first amplitude and phase adjuster group.

With reference to the first possible implementation manner of the first aspect, in a sixth possible implementation manner, the self-interference signal reconstruction module (1502) includes:

a second delayer group, a second amplitude and phase adjuster group, and a second combiner, where:

the second delayer group includes at least one circulator and at least one delayer, where the at least one circulator is connected in series by using a first port and a third port, and one end of the delayer is connected to a second port of the circulator; the first delayer group is configured to receive the radio frequency reference signal, and perform delay processing on the radio frequency reference signal by using the at least one delayer sequentially, to form a delay signal of at least one radio frequency reference signal;

the second amplitude and phase adjuster group includes at least one amplitude and phase adjuster, where each amplitude and phase adjuster is configured to perform amplitude and phase adjustment on a delay signal of one radio frequency reference signal according to the self-interference channel parameter; and the second combiner is configured to perform combination processing on delay signals that are of radio frequency reference signals and obtained after amplitude and phase adjustment, to generate the reconstructed self-interference signal.

With reference to the sixth possible implementation manner of the first aspect, in a seventh possible implementation manner, the self-interference signal reconstruction module (1502) further includes:

a second radio frequency selection switch, configured to receive the delay signal of the at least one radio frequency reference signal, select, from delay signals of all radio frequency reference signals, a delay signal of at least one radio frequency reference signal according to the self-interference channel parameter, and transmit the selected delay signal of the at least one radio frequency reference signal to the second amplitude and phase adjuster group.

With reference to any one of the fourth to seventh possible implementation manners of the first aspect, in an eighth possible implementation manner, the amplitude and phase adjuster includes an attenuator and a phase shifter, where:

the attenuator is configured to perform, according to the self-interference channel parameter, amplitude adjustment processing on the received delay signal that is of the radio frequency reference signal and that is transmitted by the radio frequency selection switch; and the phase shifter is configured to perform, according to self-interference channel, phase shift processing on a delay signal that is of the radio frequency reference signal and that is obtained after amplitude adjustment processing is performed by the attenuator.

With reference to the first aspect or any one of the first to eighth possible implementation manners of the first aspect, in a ninth possible implementation manner, the first-type interference canceller (130) is specifically configured to perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or perform, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the radio frequency reference signal and a phase of the first-type self-interference component in the radio frequency receive signal is 180 degrees or approximately 180 degrees.

With reference to the first aspect or any one of the first to ninth possible implementation manners of the first aspect, in a tenth possible implementation manner, the transmit signal includes a self-interference channel estimation timeslot and a data transmission timeslot that are disposed at an interval.

According to a second aspect, an interference cancellation method is provided, including:

acquiring a radio frequency reference signal generated according to a transmit signal;

receiving a radio frequency receive signal by using a main receive antenna;

canceling a first-type self-interference component in the radio frequency receive signal according to the radio frequency reference signal, to generate a first processed signal, where the first-type self-interference component includes a main-path self-interference component;

acquiring the reconstructed self-interference signal according to a self-interference channel parameter and the radio frequency reference signal;

canceling a second-type self-interference component in the first processed signal according to the reconstructed self-interference signal to generate a second processed signal;

performing down-conversion processing on the second processed signal to generate a third processed signal;

performing analog to digital conversion on the third processed signal to generate a digital signal; and acquiring a digital baseband reference signal, and performing self-interference channel estimation according to the digital baseband reference signal and the digital signal to acquire the self-interference channel parameter.

With reference to the second aspect, in a first possible implementation manner, the method further includes: amplifying the second processed signal.

With reference to the second aspect, in a second possible implementation manner, the method further includes:

amplifying the first processed signal; and before the acquiring the reconstructed self-interference signal according to the self-interference channel parameter and the radio frequency reference signal, the method includes: amplifying the radio frequency reference signal.

With reference to the second aspect, in a third possible implementation manner, the acquiring the reconstructed self-interference signal according to a self-interference channel parameter and the radio frequency reference signal includes:

performing delay processing on the radio frequency reference signal for at least one time, to form a delay signal of at least one radio frequency reference signal;

performing amplitude and phase adjustment on a delay signal of each radio frequency reference signal according to the self-interference channel parameter; and performing combination processing on delay signals that are of radio frequency reference signals and obtained after amplitude and phase adjustment, to generate the reconstructed self-interference signal.

With reference to the third possible implementation manner, in a fourth possible implementation manner, before the performing amplitude and phase adjustment on a delay signal of each radio frequency reference signal according to the self-interference channel parameter, the method further includes:

selecting, from delay signals of all radio frequency reference signals, a delay signal of at least one radio frequency reference signal according to the self-interference channel parameter; and the performing amplitude and phase adjustment on a delay signal of each radio frequency reference signal according to the self-interference channel parameter is specifically: performing amplitude and phase adjustment on the delay signal of each radio frequency reference signal in the selected delay signal of the at least one radio frequency reference signal.

With reference to the third possible implementation manner, in a fifth possible implementation manner, the performing amplitude and phase adjustment on a delay signal of each radio frequency reference signal according to the self-interference channel parameter includes:

performing amplitude adjustment processing on the delay signal of the radio frequency reference signal according to the self-interference channel parameter; and performing, according to the self-interference channel parameter, phase shift processing on a delay signal that is of the radio frequency reference signal and that is obtained after amplitude adjustment processing is performed.

With reference to the second aspect or any one possible implementation manner of the second aspect, in a sixth possible implementation manner, the cancelling first-type self-interference component in the radio frequency receive signal according to the radio frequency reference signal includes:

performing, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or performing, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the radio frequency reference signal and a phase of the first-type self-interference component in the radio frequency receive signal is 180 degrees or approximately 180 degrees.

With reference to the second aspect or any one possible implementation manner of the second aspect, in a seventh possible implementation manner, the transmit signal includes a self-interference channel estimation timeslot and a data transmission timeslot that are disposed at an interval.

In the interference cancellation apparatus and method according to the embodiments of the present invention, for a radio frequency receive signal acquired by a main receive antenna, interference cancellation processing is performed according to a radio frequency reference signal to cancel a first-type self-interference component in the radio frequency receive signal and acquire a first processed signal; and further, a reconstructed self-interference signal is acquired through self-interference channel estimation to cancel a second-type self-interference component in the first processed signal. Because the reconstructed self-interference signal is used directly in an analog domain to cancel the second-type self-interference component, a limitation by a dynamic range of an ADC/DAC can be avoided, and the second-type self-interference component can be canceled effectively.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

REFERENCE SIGNS IN THE DRAWINGS

Figure 1:
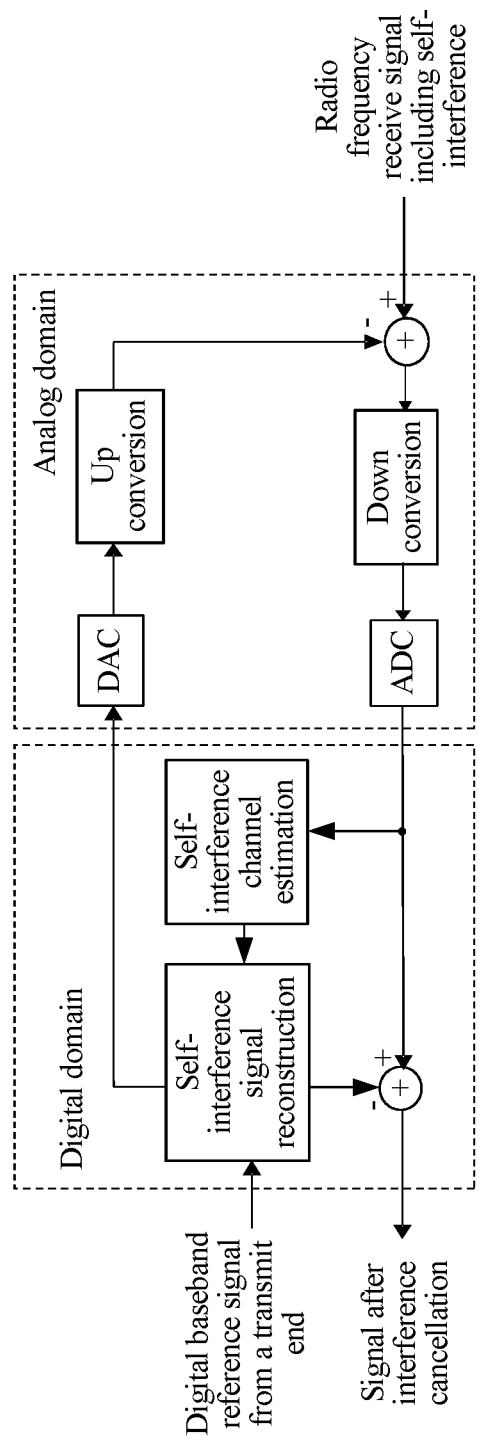
FIG. 1 is a schematic structural diagram of an interference cancellation apparatus according to the prior art.

110—main receive antenna
120—splitter
121—input end of the splitter
122—first output end of the splitter
123—second output end of the splitter
130—first-type interference canceller
131—first input end of the first-type interference canceller
132—second input end of the first-type interference canceller
133—output end of the first-type interference canceller
140—coupler
141—first input end of the coupler
142—second input end of the coupler
143—output end of the coupler
150—second-type interference reconstructor
151—first input end of the second-type interference reconstructor
152—second input end of the second-type interference reconstructor
153—output end of the second-type interference reconstructor
154—third input end of the second-type interference reconstructor
1501—self-interference estimation module
1502—self-interference signal reconstruction module
160—down converter
161—input end of the down converter
162—output end of the down converter
170—ADC 171—input end of the ADC
172—output end of the ADC

DESCRIPTION OF EMBODIMENTS

Multiple embodiments are herein described with reference to the accompanying drawings, and same parts in this specification are indicated by a same reference numeral. In the following description, for ease of explanation, many specific details are provided to facilitate comprehensive understanding of one or more embodiments. However, apparently, the embodiments may also not be implemented by using these specific details. In other examples, a well-known structure and device are shown in a form of block diagrams, to conveniently describe one or more embodiments.

Terminologies such as "part", "module", and "system" used in this specification are used to indicate computer-related entities, hardware, firmware, combinations of hardware and software, software, or software being executed. For example, a part may be, but is not limited to, a process that runs on a processor, a processor, an object, an executable file, a thread of execution, a program, and/or a computer. As shown in figures, both a computing device and an application that runs on a computing device may be parts. One or more parts may reside within a process and/or a thread of execution, and a part may be located on one computer and/or distributed between two or more computers. In addition, these parts may be executed from various computer-readable media that store various data structures. For example, the parts may communicate by using a local and/or remote process and according to, for example, a signal having one or more data packets (for example, data from two parts interacting with another part in a local system, a distributed system, and/or across a network such as the Internet interacting with other systems by using the signal).

An interference cancellation apparatus according to an embodiment of the present invention may be disposed in an access terminal that uses a wireless full duplex technology. An access terminal may also be referred to as a system, a subscriber unit, a subscriber station, a mobile station, a remote station, a remote terminal, a mobile device, a user terminal, a terminal, a wireless communications device, user agent, a user apparatus, or user equipment (UE, User Equipment). The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless communication function, an in-vehicle device, a wearable device, a computing device, or another processing device connected to a wireless modem.

In addition, the interference cancellation apparatus according to the embodiment of the present invention may also be disposed in a base station that uses the wireless full duplex technology. The base station may be configured to communicate with a mobile device. The base station may be an AP (Access Point, wireless access point) of a WiFi system, or a BTS (Base Transceiver Station, base transceiver station) in a GSM (Global System for Mobile communication, Global System for Mobile Communication) system or a CDMA (Code Division Multiple Access, Code Division Multiple Access) system, or may be an NB (NodeB, NodeB) in a WCDMA (Wideband Code Division Multiple Access, Wideband Code Division Multiple Access) system, or may be an eNB or an eNodeB (Evolved Node B, evolved NodeB) in a LTE (Long Term Evolution, Long Term Evolution) system, or a relay station or an access point, or a base station device in a future 5G network, or the like.

In addition, aspects or features of the present invention may be implemented as an apparatus or a product that uses standard programming and/or engineering technologies. The term "product" used in this application covers a computer program that can be accessed from any computer-readable part, carrier or medium. For example, the computer-readable medium may include but is not limited to: a magnetic storage part (for example, a hard disk, a floppy disk or a magnetic tape), an optical disc (for example, a CD (Compact Disk, compact disk), a DVD (Digital Versatile Disk, digital versatile disk), a smart card and a flash memory part (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine-readable media" may include but is not limited to a radio channel, and various other media that can store, include and/or carry an instruction and/or data.

It should be noted that in the embodiments of the present invention, interference cancellation may be canceling all interference components in a signal (including a first-type self-interference component and a second-type self-interference component), or may be canceling some interference components in a signal (including a part of a first-type self-interference component and a part of a second-type self-interference component).

Figure 2:
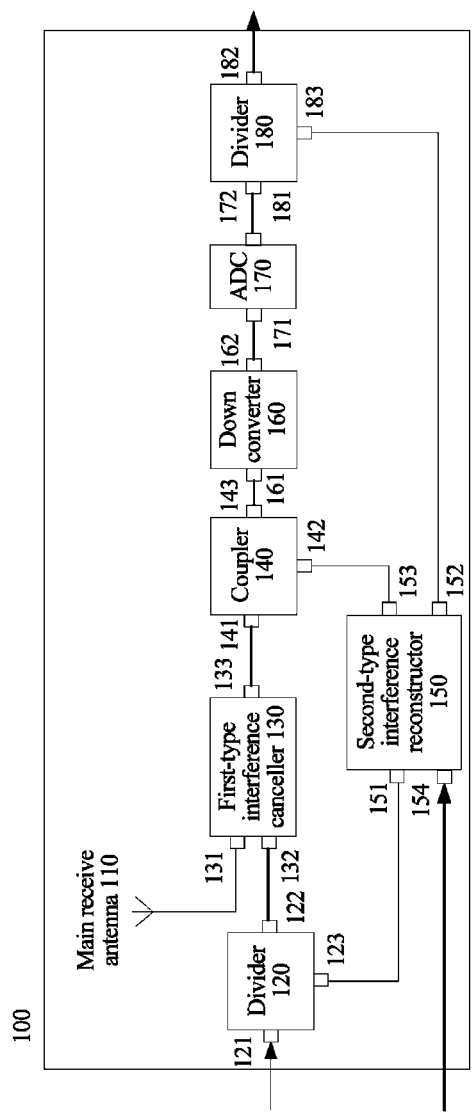
FIG. 2 is a schematic structural diagram of an interference cancellation apparatus according to an embodiment of the present invention.

FIG. 2 is a schematic structural diagram of an interference cancellation apparatus according to an embodiment of the present invention. As shown in FIG. 2, an apparatus 100 provided by this embodiment includes:

a main receive antenna 110, a splitter 120, a first-type interference canceller 130, a coupler 140, a second-type interference reconstructor 150, a down converter 160, an ADC 170, and a splitter 180, where: an output end of the main receive antenna 110 is connected to a first input end 131 of the first-type interference canceller 130; an input end 121 of the splitter 120 is configured to acquire a radio frequency reference signal generated according to a transmit signal; a first output end 122 of the splitter 120 is connected to a second input end 132 of the first-type interference canceller 130; an output end 133 of the first-type interference canceller 130 is connected to a first input end 141 of the coupler 140; a second output end 123 of the splitter 120 is connected to a first input end 151 of the second-type interference reconstructor 150; a second input end 142 of the coupler 140 is connected to an output end 153 of the second-type interference reconstructor 150; a third input end 154 of the second-type interference reconstructor 150 inputs a digital baseband reference signal; an output end 143 of the coupler 140 is connected to an input end 161 of the down converter 160; an output end 162 of the down converter is connected to an input end 171 of the ADC 170; an output end 172 of the ADC is connected to a first input end 181 of the splitter 180; a first output end 182 of the splitter 180 outputs a digital signal; and a second output end 183 of the splitter 180 is connected to a second input end 152 of the second-type interference reconstructor 150.

Functions of parts in the embodiment shown in FIG. 2 are described as follows:

The main receive antenna 110 is configured to receive a radio frequency receive signal, and transmit the radio frequency receive signal to the first-type interference canceller 130.

The splitter 120 is configured to acquire a radio frequency reference signal generated according to a transmit signal, and transmit the radio frequency reference signal to the first-type interference canceller 130 and the second-type interference reconstructor 150.

The first-type interference canceller 130 is configured to receive the radio frequency reference signal transmitted by the splitter 120 and the radio frequency receive signal transmitted by the main receive antenna 110, and cancel a first-type self-interference component in the radio frequency receive signal according to the radio frequency reference signal to acquire a first processed signal, where the first-type self-interference component includes a main-path self-interference component.

The second-type interference reconstructor 150 is configured to acquire the reconstructed self-interference signal according to a self-interference channel parameter and the radio frequency reference signal transmitted by the splitter 120.

The coupler 140 is configured to receive the first processed signal and the reconstructed self-interference signal transmitted by the second-type interference reconstructor 150, and cancel a second-type self-interference component in the first processed signal according to the reconstructed self-interference signal to generate a second processed signal.

The down converter 160 is configured to perform down-conversion processing on the second processed signal to generate a third processed signal.

The analog to digital converter ADC 170 is configured to perform analog to digital conversion on the third processed signal to generate a digital signal.

The second-type interference reconstructor 150 is further configured to acquire a digital baseband reference signal, receive the digital signal generated by the analog to digital converter ADC 170 and the radio frequency reference signal transmitted by the splitter 120, and perform self-interference channel estimation according to the digital baseband reference signal and the digital signal to acquire the self-interference channel parameter.

FIG. 2 further shows that the splitter 180 is configured to use the digital signal converted from the third processed signal as an output signal and as an input signal of the second-type interference reconstructor 150 separately.

Connection relationships, structures, and functions of parts in the embodiment shown in FIG. 2 are described in detail as follows:

(1) Main Receive Antenna 110

The main receive antenna 110 is configured to receive a radio signal, and input the received radio signal as a radio frequency receive signal to the first input end 131 of the first-type interference canceller 130, where the process of receiving a radio signal by the main receive antenna 110 may be similar to the process of receiving a radio signal by an antenna in the prior art, and is not further described herein for avoiding repetition.

(2) Splitter 120

Specifically, in the embodiment of the present invention, for example, a coupler or a power splitter may be used as the splitter 120.

In addition, because a radio frequency reference signal is acquired according to a transmit signal from a transmitter, a transmit signal after baseband processing, for example, may be used as a radio frequency reference signal, and input to the splitter 120 through the input end 121 of the splitter.

Therefore, the splitter 120 can divide the radio frequency reference signal into two signals. One signal is transmitted to the second input end 132 of the first-type interference canceller 130 through the first output end 122 of the splitter 120 and is received by the first-type interference canceller 130. The other signal is transmitted to the first input end 151 of the second-type interference reconstructor 150 through the second output end 123 of the splitter 120 and is received by the second-type interference reconstructor 150.

The coupler or power splitter is used as the splitter 120 in such a manner that waveforms of the two signals output from the splitter 120 can be consistent with that of the radio frequency reference signal, which is good for subsequent interference cancellation based on the radio frequency reference signal.

It should be understood that the foregoing illustrated coupler and power splitter that are used as the splitter 120 are intended for exemplary description only, but the present invention is not limited thereto. All other apparatuses that can cause a similarity between a waveform of a reference signal and a waveform of a transmit signal to be in a preset range shall fall within the protection scope of the present invention.

It should be noted that in the embodiment of the present invention, power of the two signals that the radio frequency reference signal is divided into may be the same or may be different, which is not particularly limited by the present invention.

In addition, in the embodiment of the present invention, the process of transmitting the transmit signal after baseband processing may be similar to that in the prior art. Herein for avoiding repetition, the description of the process is omitted.

(3) First-Type Interference Canceller 130

Figure 3:
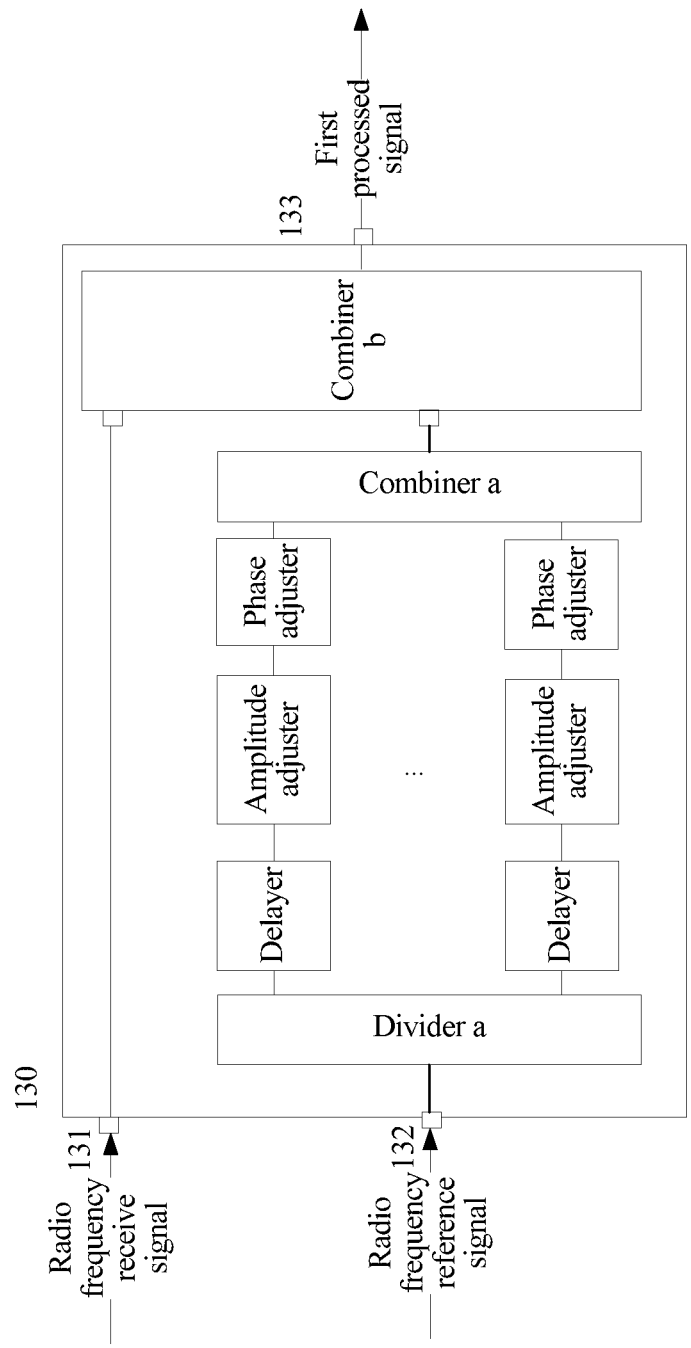
FIG. 3 is a schematic structural diagram of a first-type interference canceller according to an embodiment of the present invention.

Specifically, as shown in FIG. 3, in the embodiment of the present invention, the first-type interference canceller 130 may include a splitter a, a combiner a, and a combiner b, where at least one transmission path constituted by at least one of a delayer, a phase adjuster, and an amplitude adjuster connected in series is included between the splitter a and the combiner a, where an output end of the combiner a is connected to an input end of the combiner b. In the embodiment of the present invention, the first-type interference canceller 130 has two input ends. The splitter a may be a power splitter, and the combiner a and the combiner b may be couplers.

The first input end 131 (namely, an input port of the combiner b) of the first-type interference canceller 130 is connected to the output end of the main receive antenna 110, and is configured to receive a signal (namely, a radio frequency receive signal) from the output end of the main receive antenna 110; the second input end 132 (namely, an input port of the splitter a) of the first-type interference canceller 130 is connected to the first output end 122 of the splitter 120, and is configured to receive one radio frequency reference signal from the splitter 120.

Optionally, the first-type interference canceller 130 is specifically configured to perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or perform, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the reference signal and a phase of the first-type self-interference component in the radio frequency receive signal is 180 degrees or approximately 180 degrees; and combine radio frequency reference signals obtained after delay processing, amplitude adjustment processing, and phase adjustment processing with the radio frequency receive signal.

Specifically, the second input end 132 of the first-type interference canceller 130 is connected to the first output end 122 of the splitter 120, and a signal (namely, a radio frequency reference signal) output from the first output end 122 of the splitter 120 is input through the second input end 132 of the first-type interference canceller 130 to the splitter a, where the splitter a may be a power splitter. The splitter a divides the radio frequency reference signal into several radio frequency reference signals (power of the several radio frequency reference signals may be the same or different). Using one of the several radio frequency reference signals as an example for description, an output end of the splitter a outputs one radio frequency reference signal to an adjustment circuit constituted by a delayer, a phase adjuster, and an amplitude adjuster that are connected in series, where the adjustment circuit is configured to adjust a delay, an amplitude, and a phase of a signal by means of delaying, attenuation, phase shifting, and the like. For example, through attenuation, the amplitude of the radio frequency reference signal may approach the amplitude of the first-type self-interference component (including a main-path self-interference component) in the radio frequency receive signal. Certainly, a best effect is that the amplitudes are the same. However, because an error exists in an actual application, the amplitudes may be adjusted to approximately the same. In addition, through delaying and/or through phase shifting, the difference between the phase of the radio frequency reference signal and the phase of the radio frequency receive signal (specifically, the first-type self-interference component in the radio frequency receive signal) may be adjusted to 180 degrees or approximately 180 degrees.

Alternatively, through attenuation, the amplitude of the radio frequency reference signal may be in a direction opposite to the amplitude of the first-type self-interference component in the radio frequency receive signal. Certainly, a best effect is that directions of the amplitudes are opposite. However, because an error exists in an actual application, the amplitudes may be adjusted to be approximately opposite. In addition, through delaying and/or through phase shifting, the phase of the radio frequency reference signal may be adjusted to be the same or approximately the same as the phase of the radio frequency receive signal (specifically, the first-type self-interference component in the radio frequency receive signal).

The foregoing just takes one radio frequency reference signal output by the splitter as example for description. Certainly, because the splitter divides the radio frequency reference signal into multiple signals, and finally the signals are combined by the combiner a, the delay processing, amplitude adjustment processing, and phase adjustment processing may also be functions that occur on each tributary output by the splitter, and finally, after combination, objectives of the delay processing, amplitude adjustment processing, and phase adjustment processing of the radio frequency reference signal input at the input end of the splitter are achieved, that is, each tributary output by the splitter may include at least one of a delayer, a phase adjuster, and an amplitude adjuster.

Certainly, the amplitude adjustment may be expressed as attenuation or gain, and only attenuation is used as an example for description in the foregoing embodiment. In addition, in the embodiment of the present invention, "approximately" may indicate that a similarity between two is within a preset range, where the preset range may be determined at random according to actual use and requirements, and is not particularly limited by the present invention. For avoiding repetition, the following omits descriptions of similarities unless otherwise specified.

Afterward, radio frequency reference signals of all tributaries output by the splitter a are combined by the combiner a after the amplitude and phase adjustment, and the radio frequency receive signal is input to another input port of the combiner b. Therefore, the combiner b may combine the radio frequency receive signal with the radio frequency reference signal obtained after the amplitude and phase adjustment and combination (for example, add the radio frequency reference signal to the radio frequency receive signal or subtract the radio frequency reference signal from the radio frequency receive signal), to cancel the first-type self-interference component in the radio frequency receive signal, thereby implementing first-type self-interference component cancellation processing for the radio frequency receive signal.

For illustration instead of limitation, in the embodiment of the present invention, the amplitude adjuster may be, for example, an attenuator. The phase adjuster may be, for example, a phase shifter. The delayer may be, for example, a delay line.

Therefore, the first processed signal output from the output end 133 (specifically, the output end of the combiner b) of the first-type interference canceller 130 is a signal generated by canceling the first-type self-interference component in the radio frequency receive signal.

It should be noted that in the embodiment of the present invention, the delayer, phase adjuster, and amplitude adjuster may be adjusted in a manner of minimizing strength of the first processed signal output by the combiner b, based on the output of the combiner b. In addition, the present invention is not limited to the foregoing implementation manner, as long as strength of the radio frequency receive signal can be reduced according to the radio frequency reference signal (or strength of the first processed signal is less than strength of the radio frequency receive signal), an interference cancellation effect can be achieved.

(4) Second-Type Interference Reconstructor 150

Figure 4:
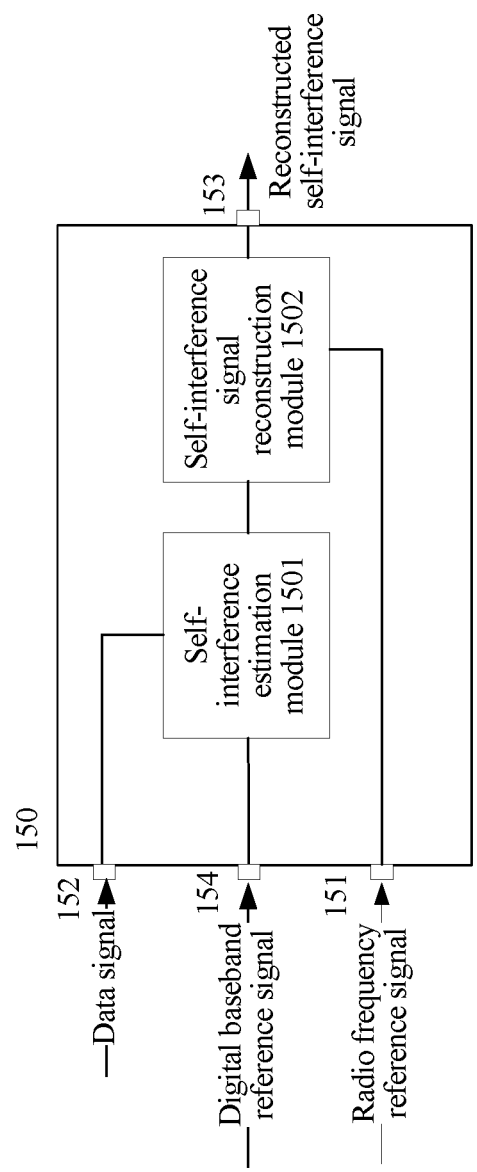
FIG. 4 is a schematic structural diagram of a second-type interference reconstructor according to an embodiment of the present invention.

Specifically, as shown in FIG. 4, in the embodiment of the present invention, the second-type interference reconstructor 150 may include a self-interference estimation module 1501 and a self-interference signal reconstruction module 1502.

The self-interference estimation module 1501 is configured to acquire the digital baseband reference signal, receive the digital signal generated by the analog to digital converter ADC 170, and perform self-interference channel estimation according to the digital baseband reference signal and the digital signal to acquire the self-interference channel parameter.

Optionally, the self-interference estimation module 1501 includes any one of a field-programmable gate array FPGA (Field-Programmable Gate Array), a central processing unit CPU (Central Processing Unit), and an application-specific integrated circuit ASIC (Application Specific Integrated Circuit). To perform self-interference channel estimation according to the digital baseband reference signal and the digital signal, a pilot-based channel estimation method or an adaptive filtering method such as an LMS (Least mean square, least mean squares) algorithm or an RLS (Recursive least squares, recursive least squares) algorithm may be used, which pertains to the prior art and is not further described.

In addition, optionally, the transmit signal includes a self-interference channel estimation timeslot and a data transmission timeslot that are disposed at an interval. In the data transmission timeslot, full duplex data communication may be performed. In the self-interference channel estimation timeslot, a communications peer does not transmit data, and a signal received by a local receiver includes only a self-interference signal. Because there is no signal from the communications peer, the local end uses the self-interference channel estimation timeslot to perform self-interference channel estimation to acquire a self-interference channel parameter. Specifically, in the self-interference channel estimation timeslot, the radio frequency receive signal includes only a second-type self-interference component. In the self-interference channel estimation timeslot, by referring to the digital baseband reference signal, self-interference channel estimation is performed on the digital signal that is acquired by processing the radio frequency receive signal. Therefore, in the self-interference channel estimation timeslot, the communications peer does not transmit a signal, and a signal received by the receiver includes only a self-interference signal. Because there is no signal from the communications peer, the receiver may perform self-interference channel estimation in the self-interference channel estimation timeslot to acquire a self-interference channel parameter, where the self-interference channel parameter may include parameters indicating a transmission path delay, a phase, and an amplitude of a second-type self-interference component. In the data transmission timeslot, a signal received by the receiver includes a self-interference signal and a data signal, and the receiver may generate a reconstructed self-interference signal in the data transmission timeslot according to the radio frequency reference signal and the self-interference channel parameter, and use the reconstructed self-interference signal to cancel the second-type self-interference component.

The self-interference signal reconstruction module 1502 is configured to receive the radio frequency reference signal transmitted by the splitter 120 and the self-interference channel parameter acquired by the self-interference estimation module 1501, and acquire the reconstructed self-interference signal according to the self-interference channel parameter and the radio frequency reference signal.

Figure 5:
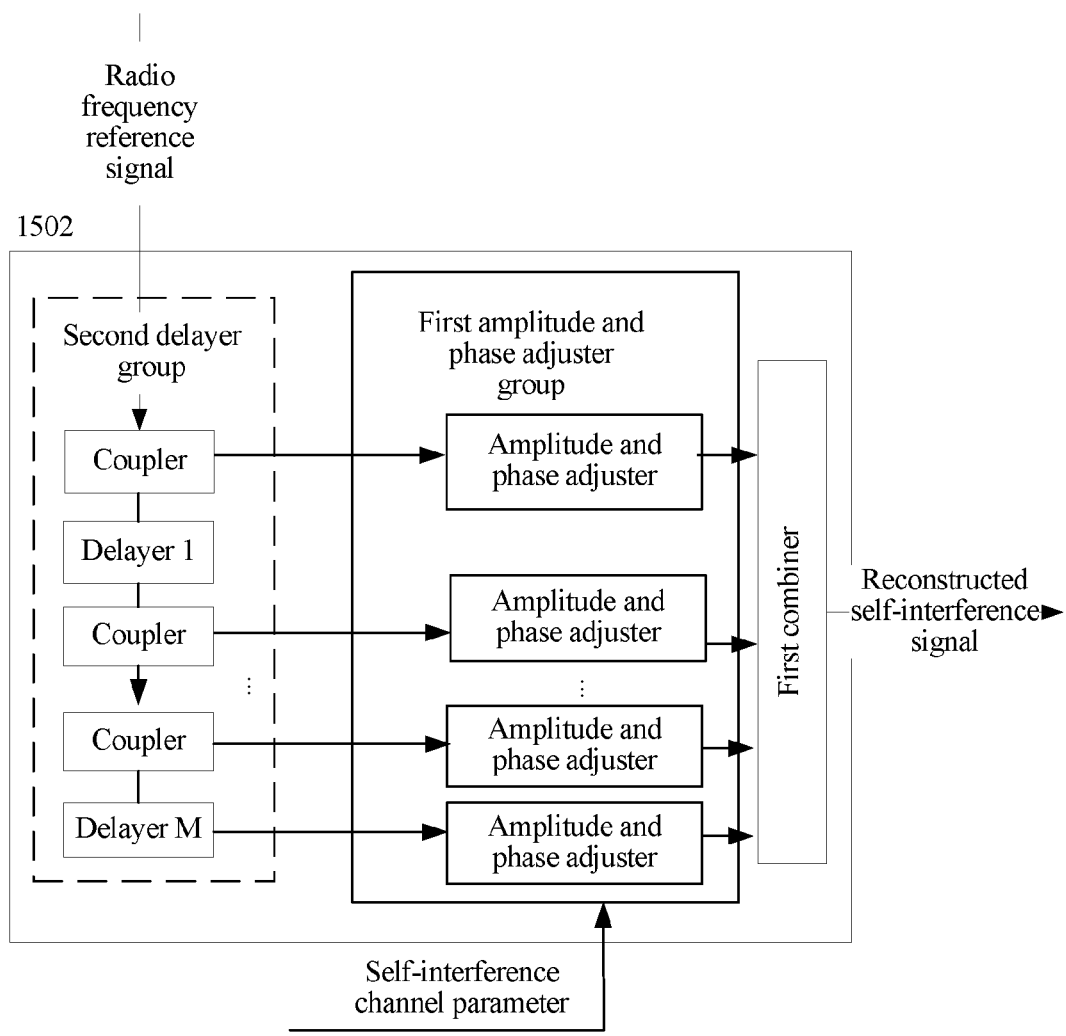
FIG. 5 is a schematic structural diagram of a self-interference signal reconstruction module according to an embodiment of the present invention.

Further, referring to FIG. 5, the self-interference signal reconstruction module 1502 includes:

a first delayer group, a first amplitude and phase adjuster group, and a first combiner, where:

the first delayer group includes at least one delayer, where the at least one delayer is connected in series, and the first delayer group is configured to receive the radio frequency reference signal, and perform delay processing on the radio frequency reference signal by using the at least one delayer sequentially, to form a delay signal of at least one radio frequency reference signal;

the first amplitude and phase adjuster group includes at least one amplitude and phase adjuster, where each amplitude and phase adjuster is configured to perform amplitude and phase adjustment on a delay signal of one radio frequency reference signal according to the self-interference channel parameter; and the first combiner is configured to perform combination processing on delay signals that are of radio frequency reference signals and obtained after amplitude and phase adjustment, to generate the reconstructed self-interference signal.

In addition, with reference to FIG. 5 and in combination with the foregoing description, it may be understood that the delayers in the first delayer group are connected by couplers, and that a delay signal of a radio frequency reference signal, formed in each delay, is output by a coupler. That is, an output end of a previous delayer is connected to an input end of the coupler, an output end of the coupler is connected to an amplitude and phase adjuster in the first amplitude and phase adjuster group, and another output end of the coupler is connected to an input end of a next delayer (the previous and next are only intended for clearly describing a sequence of transferring the radio frequency reference signal in the first delayer group, and not for limiting the implementation manner of the present invention). The first delayer group may include M delayers configured to delay the radio frequency reference signal for M times and form delay signals of M radio frequency reference signals. A quantity of delay taps that may be formed by the M delayers included in the first delayer group is M.

Figure 6:
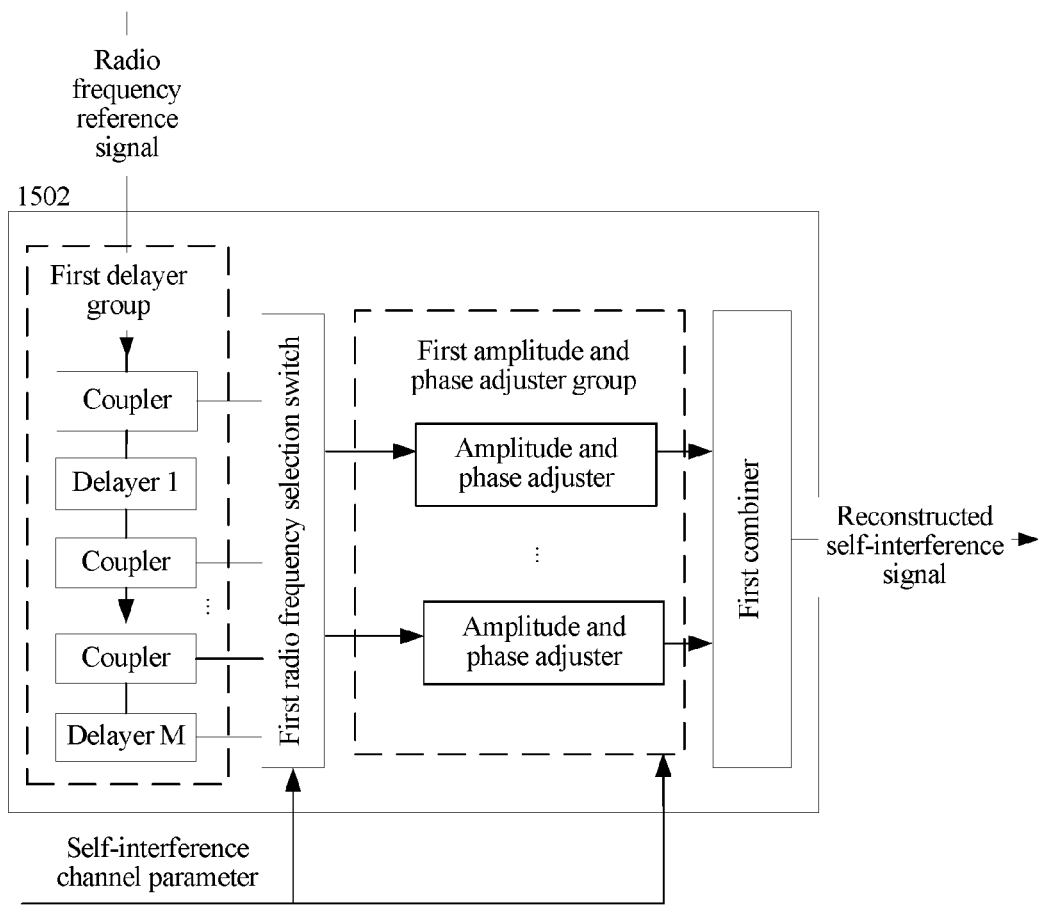
FIG. 6 is a schematic structural diagram of a self-interference signal reconstruction module according to another embodiment of the present invention.

Further, referring to FIG. 6, the self-interference signal reconstruction module further includes:

a first radio frequency selection switch, configured to receive the delay signal of the at least one radio frequency reference signal, select, from delay signals of all radio frequency reference signals, a delay signal of at least one radio frequency reference signal according to the self-interference channel parameter, and transmit the selected delay signal of the at least one radio frequency reference signal to the first amplitude and phase adjuster group.

The first radio frequency selection switch may be an M×K radio frequency selection switch. That is, in delay signals of the received M radio frequency reference signals, delay signals of K radio frequency reference signals may be selected from the delay signals of the M radio frequency reference signals according to the self-interference channel parameter and output.

Figure 7:
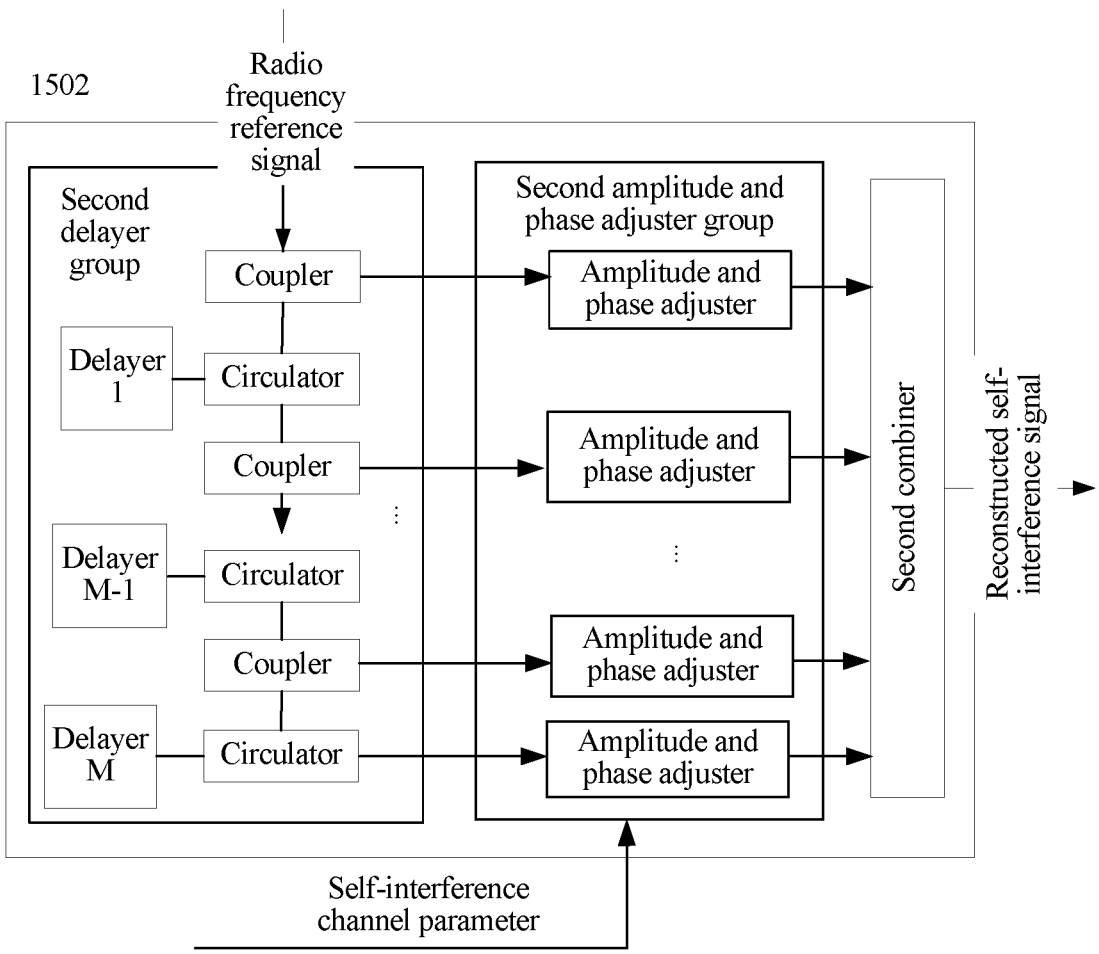
FIG. 7 is a schematic structural diagram of a self-interference signal reconstruction module according to still another embodiment of the present invention.

Alternatively, optionally, referring to FIG. 7, the self-interference signal reconstruction module 1502 includes:

a second delayer group, a second amplitude and phase adjuster group, and a second combiner, where:

the second delayer group includes at least one circulator and at least one delayer, where the at least one circulator is connected in series by using a first port and a third port, and one end of the delayer is connected to a second port of the circulator; the first delayer group is configured to receive the radio frequency reference signal, and perform delay processing on the radio frequency reference signal by using the at least one delayer sequentially, to form a delay signal of at least one radio frequency reference signal;

the second amplitude and phase adjuster group includes at least one amplitude and phase adjuster, where each amplitude and phase adjuster is configured to perform amplitude and phase adjustment on a delay signal of one radio frequency reference signal according to the self-interference channel parameter; and the second combiner is configured to perform combination processing on delay signals that are of radio frequency reference signals and obtained after amplitude and phase adjustment, to generate the reconstructed self-interference signal.

In addition, with reference to FIG. 7 and in combination with the foregoing description, it may be understood that the circulators in the first delayer group are connected by couplers. As shown in FIG. 7, a circulator includes three ports 1, 2, and 3. The first port 1 is configured to receive one radio frequency reference signal. The second port 2 of the circulator is configured to transmit the radio frequency reference signal received by the first port 1 to a delayer. The delayer performs delay processing on the radio frequency reference signal and then returns it to the second port 2. The circulator transmits the radio frequency reference signal obtained after delay processing to a next circulator through the third port 3. Delay lines may be used as delayers. Herein, the circulator receives the delay signal formed by the delayer, and transmits, through a coupler, a delay signal of the radio frequency reference signal, formed in each delay. That is, a third port 3 of a previous circulator is connected to an input end of a coupler, an output end of the coupler is connected to an amplitude and phase adjuster in the first amplitude and phase adjuster group, and another output end of the coupler is connected to a first port 1 of a next circulator (the previous and next are only intended for clearly describing a sequence of transferring the radio frequency reference signal in the first delayer group, and not for limiting the implementation manner of the present invention). The first delayer group may include M delayers configured to delay the radio frequency reference signal for M times and form delay signals of M radio frequency reference signals. A quantity of delay taps that may be formed by the M delayers included in the first delayer group is M. In comparison with the embodiment corresponding to FIG. 6, when a delay line is used as a delayer, a single end of the delay line is connected to a second port 2 of a circulator, that is, a delay signal is formed by transmitting the radio frequency reference signal in the delay line forward and then backward, and therefore, a half of a length of the delay line may be saved in comparison with the embodiment corresponding to FIG. 6.

Figure 8:
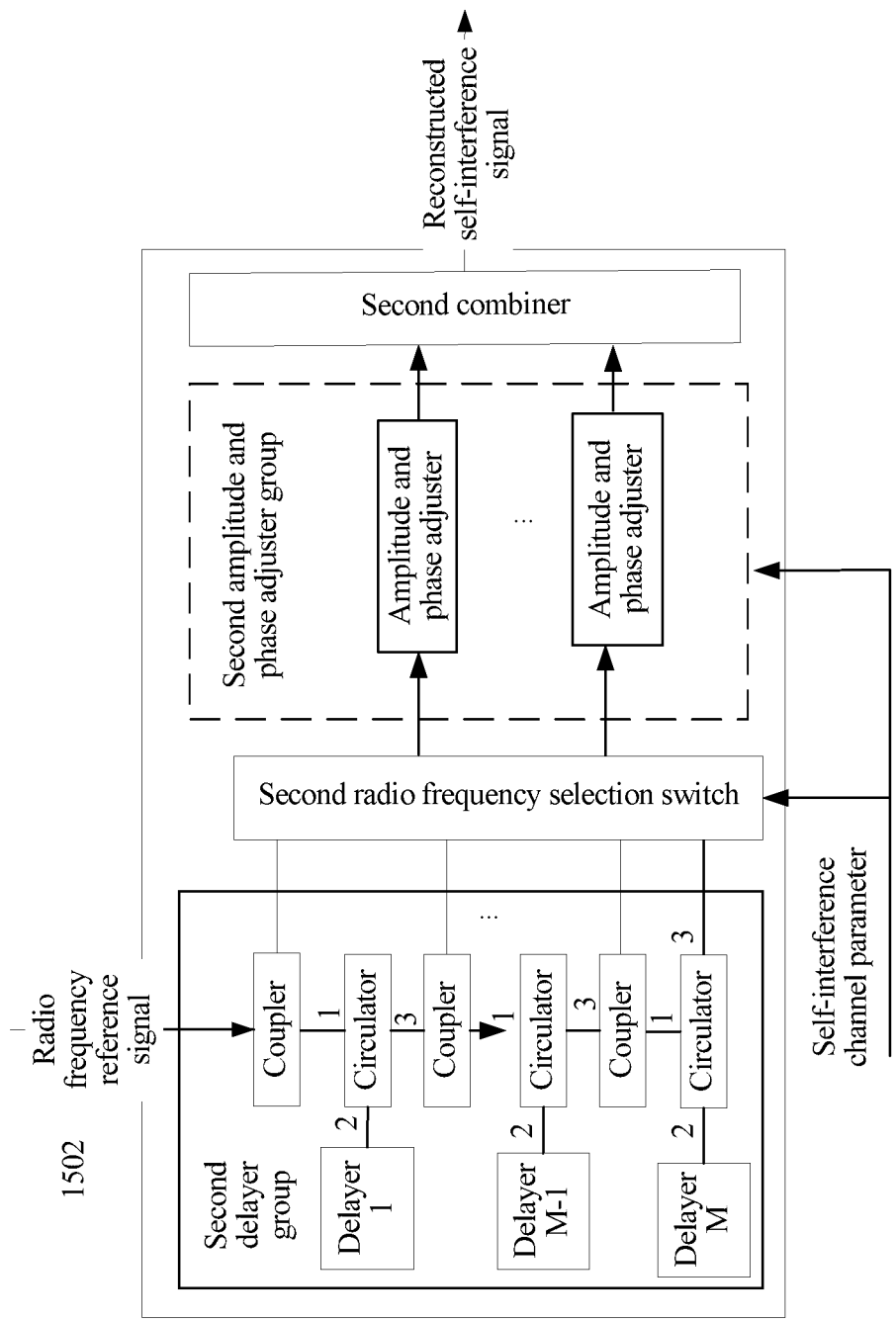
FIG. 8 is a schematic structural diagram of a self-interference signal reconstruction module according to yet another embodiment of the present invention.

Further, referring to FIG. 8, the self-interference signal reconstruction module further includes:

a second radio frequency selection switch, configured to receive the delay signal of the at least one radio frequency reference signal, select, from delay signals of all radio frequency reference signals, a delay signal of at least one radio frequency reference signal according to the self-interference channel parameter, and transmit the selected delay signal of the at least one radio frequency reference signal to the second amplitude and phase adjuster group.

The first radio frequency selection switch may be an M×K radio frequency selection switch. That is, in delay signals of the received M radio frequency reference signals, delay signals of K radio frequency reference signals may be selected from the delay signals of the M radio frequency reference signals according to the self-interference channel parameter and output.

Further, the amplitude and phase adjuster may be implemented in the following manners.

Figure 9:
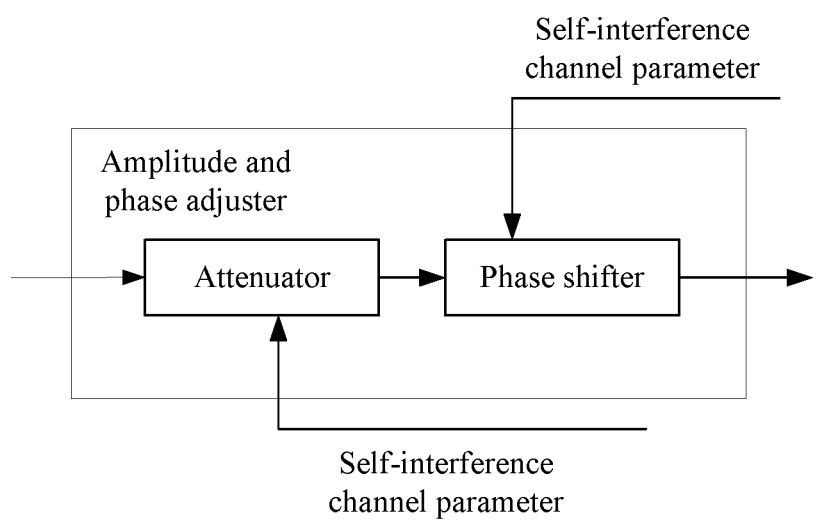
FIG. 9 is a schematic structural diagram of an amplitude and phase adjuster according to an embodiment of the present invention.

Referring to FIG. 9, in the first manner, the amplitude and phase adjuster includes: an attenuator and a phase shifter, where:

the attenuator is configured to perform, according to the self-interference channel parameter, amplitude adjustment processing on the received delay signal that is of the radio frequency reference signal and that is transmitted by the radio frequency selection switch; and the phase shifter is configured to perform, according to the self-interference channel parameter, phase shift processing on a delay signal that is of the radio frequency reference signal and that is obtained after amplitude adjustment processing is performed by the attenuator.

In the embodiments corresponding to FIG. 6, FIG. 7, FIG. 8, and FIG. 9, if a smallest multi-path delay difference of a self-interference channel that can be resolved by the self-interference signal reconstruction module 1502 is T, a delay generated by each delay tap may be set to T, that is, each delayer may form a delay T for one radio frequency reference signal. The smallest multi-path delay difference is determined according to a bandwidth W of a baseband transmit signal of a peer end, that is, $$T = \frac{1}{\alpha} \cdot \frac{1}{W},$$

where $\alpha \geq 1$, and when $\alpha > 1$, a super-resolution algorithm needs to be used for implementation. For example, a transmit signal bandwidth is W=40 MHz, and $$T = \frac{1}{W} = 25 \text{ ns}$$

may be used. If the quantity of delay taps is M=16, a reconstructed self-interference signal with a maximum delay of MT=400 ns may be reconstructed. This is equivalent to a signal reflected by a reflector that is 60 meters away from an emitter.

(5) Coupler 140

The coupler 140 is configured to receive the first processed signal generated by the first-type interference canceller 130 and the reconstructed self-interference signal transmitted by the second-type interference reconstructor 150, and cancel the second-type self-interference component in the first processed signal according to the reconstructed self-interference signal to generate the second processed signal.

(6) Down Converter 160

The down converter 160 is configured to perform down-conversion processing on the second processed signal transmitted by the coupler 140 to generate the third processed signal. Because the radio frequency receive signal is transmitted as a high frequency signal in a wireless transmission process, the down-conversion processing herein is to convert a high frequency signal component into a low frequency signal component, to avoid adverse impact of the high frequency signal component on self-interference channel estimation performed by the second-type interference reconstructor 150.

(7) ADC 170

The ADC 170 is configured to perform analog to digital conversion on the third processed signal transmitted by the down converter 160 to generate the digital signal.

(8) Splitter 180

FIG. 2 further shows the splitter 180, of which the structure and basic operating principle are the same as those of the splitter 120. The splitter 180 is configured to divide the digital signal transmitted by the ADC 170 into two digital signals, where one signal is used as an output signal, and the other signal is used as an input signal of the second-type interference reconstructor 150.

Figure 10:
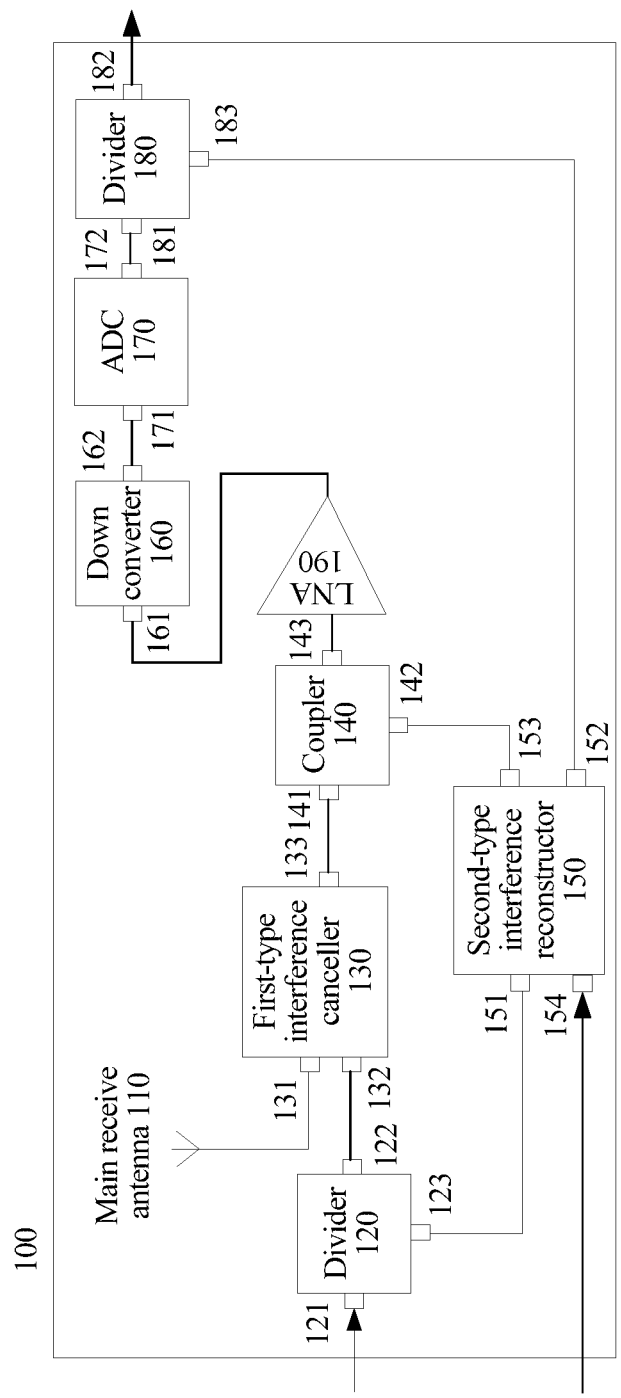
FIG. 10 is a schematic structural diagram of an interference cancellation apparatus according to another embodiment of the present invention.

Referring to FIG. 10, the interference cancellation apparatus further includes a first amplifier 190, where the first amplifier 190 is disposed between the coupler 140 and the down converter 160 (in FIG. 10, an LNA is used as an example of the first amplifier), and the first amplifier 190 is configured to amplify the second processed signal. The first amplifier amplifies the second processed signal, which may reduce a requirement of a transmitter side on power of a radio frequency transmit signal.

Figure 11:
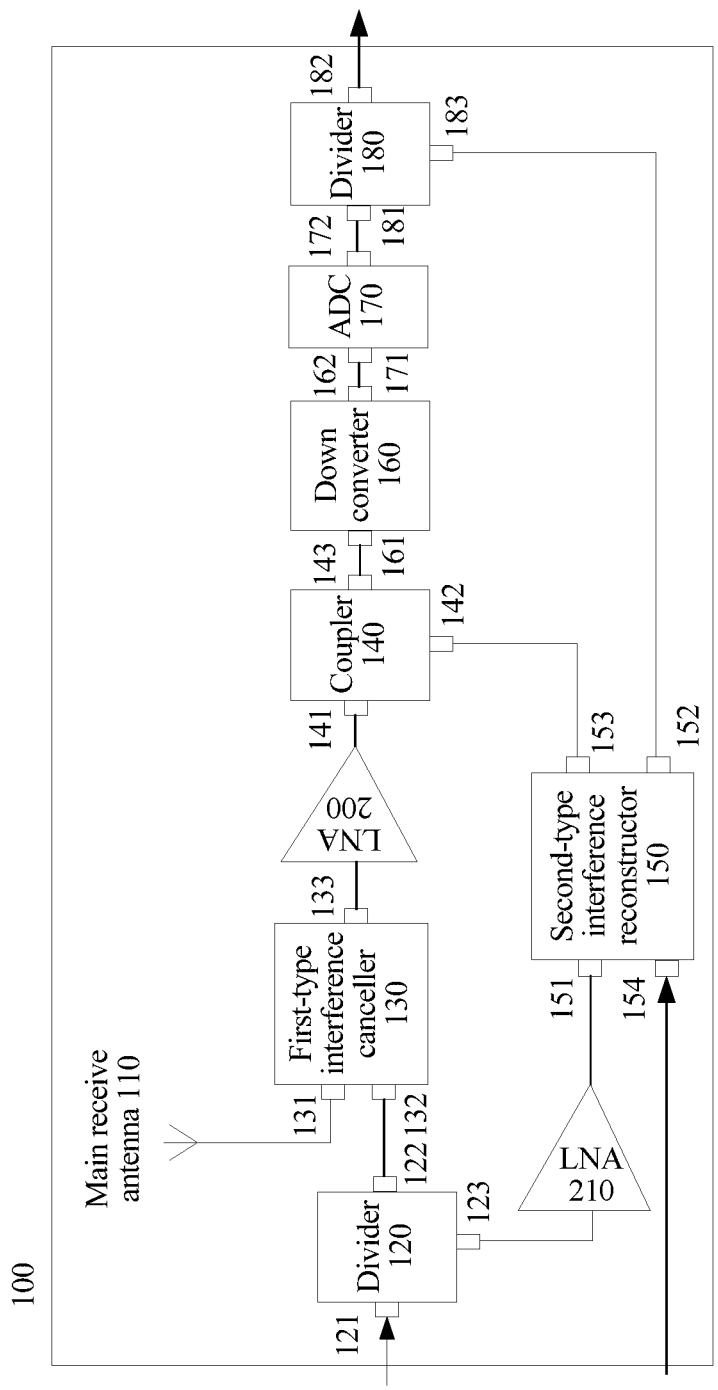
FIG. 11 is a schematic structural diagram of an interference cancellation apparatus according to still another embodiment of the present invention.

In an optional manner, referring to FIG. 11, the interference cancellation apparatus further includes:

a second amplifier 200, disposed between the first-type interference canceller 130 and the coupler 140, and configured to amplify the first processed signal; and a third amplifier 210, disposed between the splitter 120 and the second-type interference reconstructor 150, and configured to amplify the radio frequency reference signal received by the second-type interference reconstructor.

In FIG. 11, for example, both the second amplifier and the third amplifier are LNAs. The second amplifier amplifies the first processed signal before noise reduction processing, and the third amplifier amplifies the radio frequency reference signal that enters the second-type interference reconstructor 150. In this way, a requirement on power of the radio frequency reference signal may be reduced, and the requirement of the transmitter side on the power of the radio frequency transmit signal is further reduced.

It should be noted that when a full duplex transceiver performs reception and transmission by using multiple antennas (Multiple Input Multiple Output, MIMO), a receive tributary corresponding to each receive antenna requires a near-field jammer corresponding to each transmit antenna, for reconstructing a reconstructed self-interference signal corresponding to each transmit tributary and canceling the first-type self-interference components one by one.

In the interference cancellation apparatus according to the embodiment of the present invention, for a radio frequency receive signal acquired by a main receive antenna, interference cancellation processing is performed according to a radio frequency reference signal to cancel a first-type self-interference component in the radio frequency receive signal and acquire a first processed signal; and further, a reconstructed self-interference signal is acquired through self-interference channel estimation to cancel a second-type self-interference component in the first processed signal. Because the reconstructed self-interference signal is used directly in an analog domain to cancel the second-type self-interference component, a limitation by a dynamic range of an ADC/DAC can be avoided, and the second-type self-interference component can be canceled effectively.

The interference cancellation apparatus according to the embodiment of the present invention is described in detail above with reference to FIG. 1 to FIG. 11. The following describes in detail an interference cancellation method according to an embodiment of the present invention with reference to FIG. 12.

Figure 12:
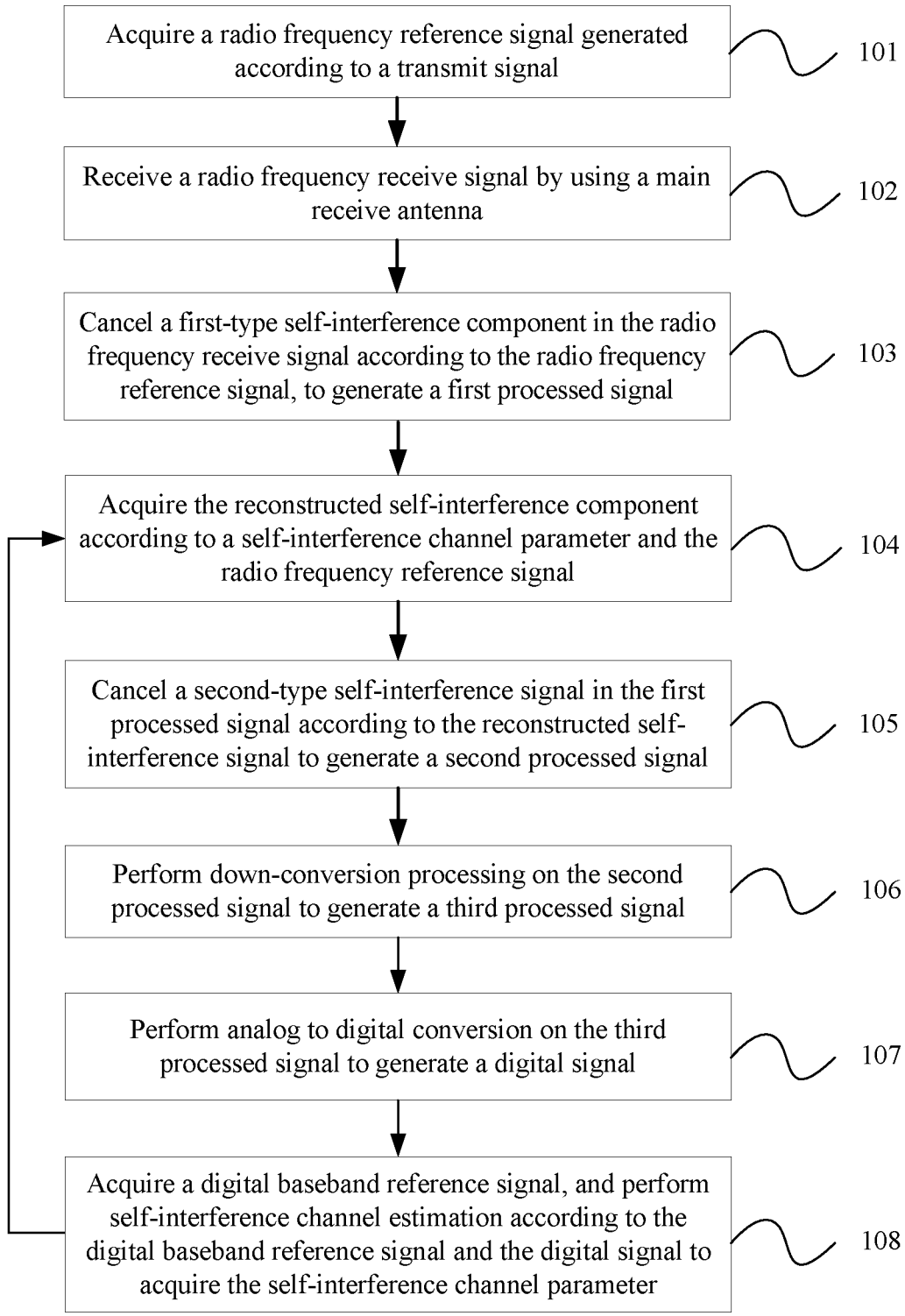
FIG. 12 is a schematic flowchart of an interference cancellation method according to an embodiment of the present invention.

FIG. 12 shows a schematic flowchart of an interference cancellation method, where the method includes the following steps:

101. Acquire a radio frequency reference signal generated according to a transmit signal.

102. Receive a radio frequency receive signal by using a main receive antenna.

103. Cancel a first-type self-interference component in the radio frequency receive signal according to the radio frequency reference signal, to generate a first processed signal, where the first-type self-interference component includes a main-path self-interference component.

104. Acquire the reconstructed self-interference signal according to a self-interference channel parameter and the radio frequency reference signal.

105. Cancel a second-type self-interference component in the first processed signal according to the reconstructed self-interference signal to generate a second processed signal.

106. Perform down-conversion processing on the second processed signal to generate a third processed signal.

107. Perform analog to digital conversion on the third processed signal to generate a digital signal.

108. Acquire a digital baseband reference signal, and perform self-interference channel estimation according to the digital baseband reference signal and the digital signal to acquire the self-interference channel parameter.

Specifically, in step 101, a transmit signal after baseband processing (for example, processing such as digital to analog conversion, up conversion, and power amplification) may be used as a radio frequency reference signal, and input to, for example, a coupler or a power splitter. Therefore, the radio frequency reference signal can be divided into two signals by the coupler or power splitter, where one signal is used to generate a first processed signal and the other signal is used to generate a reconstructed self-interference signal.

Optionally, in step 108, the acquiring a digital baseband reference signal may specifically include: acquiring the digital baseband reference signal by performing digital sampling on the radio frequency reference signal.

In addition, the coupler or power splitter is used to divide the radio frequency reference signal into two signals in such a manner that waveforms of the two signals can be consistent with that of the transmit signal, which is good for subsequent interference cancellation (including cancellation of the first-type self-interference component and cancellation of the second-type self-interference component) based on the radio frequency reference signal, where waveform consistency includes that the waveforms are the same as the waveform of the transmit signal or that a waveform similarity is within a preset range.

Optionally, after step 105, the method further includes: amplifying the second processed signal.

Alternatively, optionally, after step 103, the method further includes: amplifying the first processed signal; and before the acquiring the reconstructed self-interference signal according to the self-interference channel parameter and the radio frequency reference signal in step 104, the method further includes: amplifying the radio frequency reference signal.

The foregoing amplification of various signals is amplification performed by using a low noise amplifier (LNA). Directly amplifying the second processed signal may reduce a requirement of a transmitter side on power of a radio frequency transmit signal. Alternatively, separately amplifying the first processed signal and amplifying the radio frequency reference signal that enters the self-interference signal reconstruction module may also reduce a requirement on power of the radio frequency reference signal, and further reduce the requirement of the transmitter side on the power of the radio frequency transmit signal.

Optionally, the canceling a first-type self-interference component in the radio frequency receive signal according to the radio frequency reference signal, to generate a first processed signal in step 103 includes:

performing, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or performing, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the radio frequency reference signal and a phase of the first-type self-interference component in the radio frequency receive signal is 180 degrees or approximately 180 degrees.

In the embodiment of the present invention, for example, an adjustment circuit constituted by a delayer, a phase adjuster, and an amplitude adjuster that are connected in series may be used for implementation. Therefore, in step 103, the amplitude and phase of the radio frequency reference signal may be adjusted by the adjustment circuit through delaying, phase shifting, attenuation, and the like. For example, through attenuation, the amplitude of the radio frequency reference signal may approach the amplitude of the first-type self-interference component in the radio frequency receive signal. Certainly, a best effect is that the amplitudes are the same. However, because an error exists in an actual application, the amplitudes may be adjusted to approximately the same. In addition, through phase shifting and/or delaying, the phase of the radio frequency reference signal may be adjusted to be opposite or approximately opposite to the phase of the first-type self-interference component (including a main-path interference signal) in the radio frequency receive signal.

Afterward, radio frequency reference signals after delay processing, and amplitude adjustment, and phase adjustment may be combined with (for example, added to) the radio frequency receive signal, to cancel the first-type self-interference component in the radio frequency receive signal. In this way, first-type self-interference component cancellation processing is implemented for the radio frequency receive signal, and the signal after the processing is used as the first processed signal.

For illustration instead of limitation, in the embodiment of the present invention, the amplitude adjuster may be, for example, an attenuator. The phase adjuster may be, for example, a phase shifter, and the delayer may be a delay line.

It should be understood that the foregoing illustrated method and process for canceling the first-type self-interference component in the radio frequency receive signal based on the radio frequency reference signal are intended for exemplary description only, but the present invention is not limited thereto. For example, the delayer, phase shifter, and attenuator may also be adjusted in a manner of minimizing strength of the first processed signal.

Optionally, the acquiring the reconstructed self-interference signal according to a self-interference channel parameter and the radio frequency reference signal in step 104 includes:

performing delay processing on the radio frequency reference signal for at least one time, to form a delay signal of at least one radio frequency reference signal;

performing amplitude and phase adjustment on a delay signal of each radio frequency reference signal according to the self-interference channel parameter; and performing combination processing on delay signals that are of radio frequency reference signals and obtained after amplitude and phase adjustment, to generate the reconstructed self-interference signal.

Further, the performing amplitude and phase adjustment on a delay signal of each radio frequency reference signal according to the self-interference channel parameter in step 104 may be implemented in the following manner:

performing amplitude adjustment processing on the delay signal of the radio frequency reference signal according to the self-interference channel parameter; and performing, according to the self-interference channel parameter, phase shift processing on a delay signal that is of the radio frequency reference signal and that is obtained after amplitude adjustment processing is performed.

According to the description of the foregoing embodiment, further, the transmit signal includes a self-interference channel estimation timeslot and a data transmission timeslot that are disposed at an interval. In the self-interference channel estimation timeslot, a communications peer does not transmit a signal, and a signal received by a receiver includes only a self-interference signal. Because there is no signal from the communications peer, the receiver may perform self-interference channel estimation in the self-interference channel estimation timeslot to acquire a self-interference channel parameter, where the self-interference channel parameter may include parameters indicating a transmission path delay, a phase, and an amplitude of a second-type self-interference component. In the data transmission timeslot, a signal received by the receiver includes a self-interference signal and a data signal, and the receiver may generate a reconstructed self-interference signal in the data transmission timeslot according to the radio frequency reference signal and the self-interference channel parameter, and use the reconstructed self-interference signal to cancel the second-type self-interference component. A specific instance is not further described herein. For details, reference may be made to the description in the apparatus embodiment.

In the interference cancellation method according to the embodiment of the present invention, for a radio frequency receive signal acquired by a main receive antenna, interference cancellation processing is performed according to a radio frequency reference signal to cancel a first-type self-interference component in the radio frequency receive signal and acquire a first processed signal; and further, a reconstructed self-interference signal is acquired through self-interference channel estimation to cancel a second-type self-interference component in the first processed signal. Because the reconstructed self-interference signal is used directly in an analog domain to cancel the second-type self-interference component, a limitation by a dynamic range of an ADC/DAC can be avoided, and the second-type self-interference component can be canceled effectively.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interference cancellation apparatus, comprising:
   a main receive antenna, configured to receive a radio frequency receive signal, and transmit the radio frequency receive signal to a first-type interference canceller;
   a splitter, configured to acquire a radio frequency reference signal generated according to a transmit signal, and transmit the radio frequency reference signal to the first-type interference canceller and a second-type interference reconstructor;
   the first-type interference canceller, configured to receive the radio frequency reference signal transmitted by the splitter and the radio frequency receive signal transmitted by the main receive antenna, and cancel a first-type self-interference component in the radio frequency receive signal according to the radio frequency reference signal to generate a first processed signal, wherein the first-type self-interference component comprises a main-path self-interference component;
   the second-type interference reconstructor, configured to generate a reconstructed self-interference signal according to a self-interference channel parameter and the radio frequency reference signal transmitted by the splitter;
   a coupler, configured to receive the first processed signal and the reconstructed self-interference signal transmitted by the second-type interference reconstructor, and cancel a second-type self-interference component in the first processed signal according to the reconstructed self-interference signal to generate a second processed signal;
   a down converter, configured to perform down-conversion processing on the second processed signal to generate a third processed signal; and
   an analog to digital converter (ADC), configured to perform analog to digital conversion on the third processed signal to generate a digital signal;
   wherein the second-type interference reconstructor is further configured to acquire a digital baseband reference signal, receive the digital signal generated by the ADC and the radio frequency reference signal transmitted by the splitter, and perform self-interference channel estimation according to the digital baseband reference signal and the digital signal to generate the self-interference channel parameter;
   wherein the second-type interference reconstructor comprises:
   a self-interference estimation module configured to acquire the digital baseband reference signal receive the digital signal generated by the ADC, and perform self-interference channel estimation according to the digital baseband reference signal and the digital signal to generate the self-interference channel parameter; and
   a self-interference signal reconstruction module, configured to receive the radio frequency reference signal transmitted by the splitter and the self-interference channel parameter generated by the self-interference estimation module, and generate the reconstructed self-interference signal according to the self-interference channel parameter and the radio frequency reference signal;

wherein the self-interference signal reconstruction module comprises: a first delayer group, a first amplitude and phase adjuster group, and a first combiner, wherein:
the first delayer group comprises at least one delayer, wherein the at least one delayer is connected in series, and the first delayer group is configured to receive the radio frequency reference signal, and perform delay processing on the radio frequency reference signal by using the at least one delayer sequentially, to form a delay signal of at least one radio frequency reference signal;
the first amplitude and phase adjuster group comprises at least one amplitude and phase adjuster wherein each amplitude and phase adjuster is configured to perform amplitude and phase adjustment on a delay signal of one radio frequency reference signal according to the self-interference channel parameter; and
the first combiner is configured to perform combination processing on delay signals that are of radio frequency reference signals and obtained after amplitude and phase adjustment, to generate the reconstructed self-interference signal.

2. The apparatus according to claim 1, further comprising a first amplifier, wherein the first amplifier is configured to amplify the second processed signal.

3. The apparatus according to claim 1, further comprising a second amplifier and a third amplifier, wherein:
the second amplifier is configured to amplify the first processed signal; and
the third amplifier is configured to amplify the radio frequency reference signal received by the second-type interference reconstructor.

4. The apparatus according to claim 1, wherein the self-interference signal reconstruction module further comprises:
a first radio frequency selection switch, configured to receive the delay signal of the at least one radio frequency reference signal, select, from delay signals of all radio frequency reference signals, a delay signal of at least one radio frequency reference signal according to the self-interference channel parameter, and transmit the selected delay signal of the at least one radio frequency reference signal to the first amplitude and phase adjuster group.

5. The apparatus according to claim 1, wherein the amplitude and phase adjuster comprises an attenuator and a phase shifter, wherein:
the attenuator is configured to perform, according to the self-interference channel parameter, amplitude adjustment processing on the received delay signal that is of the radio frequency reference signal and that is transmitted by a radio frequency selection switch; and
the phase shifter is configured to perform, according to the self-interference channel parameter, phase shift processing on a delay signal that is of the radio frequency reference signal and that is obtained after amplitude adjustment processing is performed by the attenuator.

6. The apparatus according to claim 1, wherein the first-type interference canceller is further configured to:
perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or
perform, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the radio frequency reference signal and a phase of the first-type self-interference component in the radio frequency receive signal is 180 degrees or approximately 180 degrees.

7. The apparatus according to claim 1, wherein the self-interference estimation module comprises a field programmable gate array (FPGA), a central processing unit (CPU), or an application-specific integrated circuit (ASIC).

8. An interference cancellation method, comprising:
acquiring, by an interference cancellation apparatus, a radio frequency reference signal generated according to a transmit signal;
receiving, by the interference cancellation apparatus, a radio frequency receive signal by using a main receive antenna;
cancelling, by the interference cancellation apparatus, a first-type self-interference component in the radio frequency receive signal according to the radio frequency reference signal, to generate a first processed signal, wherein the first-type self-interference component comprises a main-path self-interference component;
generating, by the interference cancellation apparatus, a reconstructed self-interference signal according to a self-interference channel parameter and the radio frequency reference signal;
cancelling, by the interference cancellation apparatus, a second-type self-interference component in the first processed signal according to the reconstructed self-interference signal to generate a second processed signal;
performing by the interference cancellation apparatus, down-conversion processing on the second processed signal to generate a third processed signal;
performing, by the interference cancellation apparatus, analog to digital conversion on the third processed signal to generate a digital signal; and
acquiring, by the interference cancellation apparatus, a digital baseband reference signal, and performing self-interference channel estimation according to the digital baseband reference signal and the digital signal to generate the self-interference channel parameter;
wherein generating the reconstructed self-interference signal according to the self-interference channel parameter and the radio frequency reference signal further comprises:
performing delay processing on the radio frequency reference signal for at least one time, to form a delay signal of at least one radio frequency reference signal;
performing amplitude and phase adjustment on a delay signal of each radio frequency reference signal according to the self-interference channel parameter; and performing combination processing on delay signals that are of radio frequency reference signals and obtained after amplitude and phase adjustment, to generate the reconstructed self-interference signal.

9. The method according to claim 8, wherein the method further comprises: amplifying the second processed signal.

10. The method according to claim 8, wherein the method further comprises:
amplifying the first processed signal; and
before generating the reconstructed self-interference signal according to the self-interference channel parameter and the radio frequency reference signal, amplifying the radio frequency reference signal.

11. The method according to claim 8, wherein before performing amplitude and phase adjustment on the delay signal of each radio frequency reference signal according to the self-interference channel parameter, the method further comprises:
selecting, from delay signals of all radio frequency reference signals, a delay signal of at least one radio frequency reference signal according to the self-interference channel parameter; and
wherein performing amplitude and phase adjustment on the delay signal of each radio frequency reference signal according to the self-interference channel parameter further comprises:
performing amplitude and phase adjustment on the delay signal of each radio frequency reference signal in the selected delay signal of the at least one radio frequency reference signal.

12. The method according to claim 8, wherein performing amplitude and phase adjustment on the delay signal of each radio frequency reference signal according to the self-interference channel parameter comprises:
performing amplitude adjustment processing on the delay signal of the radio frequency reference signal according to the self-interference channel parameter; and
performing, according to the self-interference channel parameter, phase shift processing on a delay signal that is of the radio frequency reference signal and that is obtained after amplitude adjustment processing is performed.

13. The method according to claim 8, wherein cancelling the first-type self-interference component in the radio frequency receive signal according to the radio frequency reference signal comprises:
performing, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or
performing, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the radio frequency reference signal and a phase of the first-type self-interference component in the radio frequency receive signal is 180 degrees or approximately 180 degrees.

14. An interference cancellation apparatus, comprising:
a main receive antenna, configured to receive a radio frequency receive signal, and transmit the radio frequency receive signal to a first-type interference canceller;
a splitter, configured to acquire a radio frequency reference signal generated according to a transmit signal, and transmit the radio frequency reference signal to the first-type interference canceller and a second-type interference reconstructor;
the first-type interference canceller, configured to receive the radio frequency reference signal transmitted by the splitter and the radio frequency receive signal transmitted by the main receive antenna, and cancel a first-type self-interference component in the radio frequency receive signal according to the radio frequency reference signal to generate a first processed signal, wherein the first-type self-interference component comprises a main-path self-interference component;
the second-type interference reconstructor, configured to generate a reconstructed self-interference signal according to a self-interference channel parameter and the radio frequency reference signal transmitted by the splitter;
a coupler, configured to receive the first processed signal and the reconstructed self-interference signal transmitted by the second-type interference reconstructor, and cancel a second-type self-interference component in the first processed signal according to the reconstructed self-interference signal to generate a second processed signal;
a down converter, configured to perform down-conversion processing on the second processed signal to generate a third processed signal; and
an analog to digital converter (ADC), configured to perform analog to digital conversion on the third processed signal to generate a digital signal;
wherein the second-type interference reconstructor is further configured to acquire a digital baseband reference signal, receive the digital signal generated by the ADC and the radio frequency reference signal transmitted by the splitter, and perform self-interference channel estimation according to the digital baseband reference signal and the digital signal to generate the self-interference channel parameter;
wherein the second-type interference reconstructor comprises:
a self-interference estimation module, configured to acquire the digital baseband reference signal, receive the digital signal generated by the ADC, and perform self-interference channel estimation according to the digital baseband reference signal and the digital signal to generate the self-interference channel parameter; and
a self-interference signal reconstruction module, configured to receive the radio frequency reference signal transmitted by the splitter and the self-interference channel parameter generated by the self-interference estimation module, and generate the reconstructed self-interference signal according to the self-interference channel parameter and the radio frequency reference signal;

wherein the self-interference signal reconstruction module comprises: a second delayer group, a second amplitude and phase adjuster group, and a second combiner, wherein:
  the second delayer group comprises at least one circulator and at least one delayer, wherein the at least one circulator is connected in series by using a first port and a third port, and one end of the delayer is connected to a second port of the circulator; the first delayer group is configured to receive the radio frequency reference signal, and perform delay processing on the radio frequency reference signal by using the at least one delayer sequentially, to form a delay signal of at least one radio frequency reference signal;
  the second amplitude and phase adjuster group comprises at least one amplitude and phase adjuster, wherein each amplitude and phase adjuster is configured to perform amplitude and phase adjustment on a delay signal of one radio frequency reference signal according to the self-interference channel parameter; and
  the second combiner is configured to perform combination processing on delay signals that are of radio frequency reference signals and obtained after amplitude and phase adjustment, to generate the reconstructed self-interference signal.

15. The apparatus according to claim 14, further comprising a first amplifier, wherein the first amplifier is configured to amplify the second processed signal.

16. The apparatus according to claim 14, further comprising a second amplifier and a third amplifier, wherein:
  the second amplifier is configured to amplify the first processed signal; and
  the third amplifier is configured to amplify the radio frequency reference signal received by the second-type interference reconstructor.

17. The apparatus according to claim 14, wherein the self-interference signal reconstruction module further comprises:
  a second radio frequency selection switch, configured to receive the delay signal of the at least one radio frequency reference signal, select, from delay signals of all radio frequency reference signals, a delay signal of at least one radio frequency reference signal according to the self-interference channel parameter, and transmit the selected delay signal of the at least one radio frequency reference signal to the second amplitude and phase adjuster group.

18. The apparatus according to claim 14, wherein the amplitude and phase adjuster comprises an attenuator and a phase shifter, wherein:
  the attenuator is configured to perform, according to the self-interference channel parameter, amplitude adjustment processing on the received delay signal that is of the radio frequency reference signal and that is transmitted by a radio frequency selection switch; and
  the phase shifter is configured to perform, according to the self-interference channel parameter, phase shift processing on a delay signal that is of the radio frequency reference signal and that is obtained after amplitude adjustment processing is performed by the attenuator.

19. The apparatus according to claim 14, wherein the first-type interference canceller is further configured to:
  perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of the first-type self-interference component in the radio frequency receive signal, and that a phase of the radio frequency reference signal is the same or approximately the same as a phase of the first-type self-interference component in the radio frequency receive signal; or
  perform, based on the radio frequency receive signal, delay processing, amplitude adjustment processing, and phase adjustment processing on the radio frequency reference signal, so that an amplitude of the radio frequency reference signal is the same or approximately the same as an amplitude of the first-type self-interference component in the radio frequency receive signal, and that a difference between a phase of the radio frequency reference signal and a phase of the first-type self-interference component in the radio frequency receive signal is 180 degrees or approximately 180 degrees.

20. The apparatus according to claim 14, wherein the self-interference estimation module comprises a field programmable gate array (FPGA), a central processing unit (CPU), or an application-specific integrated circuit (ASIC).

* * * * *